United States Patent Office 3,207,580

Patented Sept. 21, 1965

3,207,580

PREPARATION OF WET PROCESS PHOSPHORIC ACID

Harry F. Cosway, Stamford, Sydney A. Giddings, New Canaan, and Thomas J. Malley, Stamford, Conn., assignors to American Cyanamid Company, Stamford, Conn., a corporation of Maine No Drawing. Filed Apr. 13, 1962, Ser. No. 187,214
2 Claims. (Cl. 23—165)

The present invention relates to the preparation of high-grade wet process phosphoric acid. More particularly, it relates to the step-wise defluorination and acidification of triple superphosphate by "low temperature" controlled calcination followed by acid addition. Still more specifically, this invention is concerned with the recovery of high-grade phosphoric acid from triple superphosphate originally containing more than one percent fluorine by controlled "low temperature" calcination and ultimate acidification, whereby a low-content fluorine phosphoric acid is obtained which, upon neutralization with an alkaline material, yields phosphates nutritionally valuable as animal feed supplements.

As is well known, attempts have heretofore been made to produce high-grade phosphoric acid for use as nutritionally valuable animal feed supplements from commercially available triple superphosphates by various techniques. Unfortunately, none is entirely satisfactory. For instance, triple superphosphate has been subjected to heat treatment to remove its fluorine content. However, calcining temperatures in excess of 1700° F., usually in the range of from 2000° F. to 3000° F., have been employed to reduce the aforementioned fluorine content to approximately one-half percent or below. Unfortunately, the use of such elevated temperatures, i.e., temperatures above 1700° F., has several major drawbacks. First, it requires large fuel consumption and, second, it results in the evolution of copious quantities of noxious sulfur dioxide gas. Elimination of the latter gas is usually accomplished directly by discharge into the atmosphere. This practice has been found to be undesirable because it results in contamination or pollution of the atmosphere. To chemically or otherwise absorb sulfur dioxide gas is an expensive and troublesome operation. Attempts to obviate these drawbacks have been made involving, for example, the sulfuric acid leaching of a phosphatic material as an initial step, then removing the solids so-formed and thereafter heat-treating the residual solution. The leaching step appears to remove undesirable impurities which interfere with the subsequent heat-treating operation. Moreover, leaching involves an additional operation which renders the over-all process economically unfeasible. The desirability for obtaining an efficient and economical process for the manufacture of high-grade phosphoric acid which can be readily converted to useable forms, such as nutritionally valuable phosphates, is well established.

It is, therefore, a principal object of the present invention to provide a substantially defluorinated wet process phosphoric acid capable of ready conversion to satisfactory sources of phosphorus for animal nutrition. It is a further object to provide high-grade phosphoric acid prepared by the step-wise calcination at "low temperatures" and acidification of triple superphosphate. Other objects and advantages will become apparent from a consideration of the following detailed description.

To this end, triple superphosphate ordinarily containing from about one to about three percent fluorine, is subjected to heat treatment at temperatures within the range of from about 1050° F. to about 1350° F. Unexpectedly, the fluorine content is reduced substantially utilizing the aforementioned controlled temperature range. The so-calcined, defluorinated phosphate mixture can next be subjected to acidification in an acidic medium to obtain high-grade phosphoric acid. On neutralization of the latter acid by means of lime, useful nutritionally valuable animal feed supplements are prepared.

According to the process of the present invention, triple superphosphate, as prepared for instance by initially contacting phosphate rock and wet process phosphoric acid and curing the mixture for approximately forty days, is calcined at temperatures between about 1050° F. to about 1350° F. Usually, from ten minutes to not more than sixty minutes are sufficient to cause desired defluorination to occur. The fluorine content therein is found to be substantially reduced. In general, calcination is carried out in a rotary kiln calciner, whereby the surface of the triple superphosphate is exposed for the ready removal of fluorine and occluded water. Resultant products, obtained from the calcining operation, are believed to be mixed, water-insoluble, dehydrated phosphates. The latter are then acidified by the addition of sufficient amounts of sulfuric acid to obtain products consisting essentially of desirable acid of not less than about 25% $P_2O_5$. Resultant free phosphoric acid, if desired, can be further concentrated to between 40% and 60% $P_2O_5$, thereby obtaining a substantially clear, solids-free liquid.

So-recovered phosphoric acid is then neutralized with lime, if desired, dried by exposure to warm air and heated to between about 100° C. and 160° C. Such dried calcium orthophosphates can then be incorporated in animal feeds as valuable additives.

It is advantageous that the defluorination of triple superphosphate in the operation of the present invention can be carried out at relatively "low temperatures," usually between 1050° F. and 1350° F. A preferred operating temperature range for effecting defluorination is one between about 1100° F. and 1200° F. It is a further advantage of the process that the calcination and defluorination of the triple superphosphate can be carried out in the presence of one percent to five percent added clay, talc or diatomaceous earth to prevent agglomeration and sticking. The defluorination operation is thereby facilitated. Further modifications of the calcination conditions are also contemplated. For instance, additional water vapor can be added, if desired, to the calcining atmosphere in order to increase the rate of fluorine evolution. Mixed, water-insoluble, dehydrated phosphates containing a mol ratio of phosphorus to fluorine of 100 to 1, or better, are recovered.

Resultant mixed, dehydrated, water-insoluble phosphates comprise a mixture of dicalcium pyrophosphate, calcium metaphosphate and polymeric calcium phosphates in a variety of crystalline forms. No free phosphoric acid is found in the mixture. Further, the fluorine content therein is reduced from approximately 2.3 percent to less than about 0.2 percent, or lower, and the phosphorus content, expressed as $P_2O_5$, is increased from approximately 47 percent $P_2O_5$ of the original charge to 60 percent $P_2O_5$ in the final calcined product. Nonetheless, however, the defluorinated, mixed, dehydrated phosphates cannot immediately be used as an animal feed supplement because as such they are not nutritionally available to the animal. Conversion to the free phosphoric acid followed by neutralization with a calcium compound appear to be necessary. Thus, the calcined phosphatic mixture is processed by subjecting it to acidification in the presence of sulfuric acid in amounts equal to at least stoichiometric to effect conversion of the calcined triple superphosphate to the free phosphoric acid and, if desired, neutralized to an animal feed nutrient.

In order to facilitate a further understanding of the invention, the following examples are presented primarily for purposes of illustrating certain more specific details thereof. The scope of the invention is not to be deemed limited thereby, except as defined in the claims. Unless otherwise stated, the parts are by weight.

*Example 1*

Triple superphosphate employed in this example is prepared by admixing 1.6 parts of 54% $P_2O_5$ wet process phosphoric acid with one part of finely ground phosphate rock, 80% of which passes through a 200 mesh Tyler screen and containing about 34% $P_2O_5$. It is allowed to cure for forty days. On analysis, resultant friable product contains approximately 47% $P_2O_5$ and a high fluorine content, namely, about 2.3%, in the form of metal fluorides, silicon fluorides and hydrogen fluoride.

The above-defined triple superphosphate is fed to a rotary kiln and heated to a temperature between about 1050° F. and 1100° F. for about sixty minutes. Thereafter, the so-calcined product is removed from the rotary kiln. After cooling to room temperature, it is found to contain about 60% $P_2O_5$ and 0.19% fluorine.

To 200 parts of the calcined product in a suitable reaction vessel equipped with stirrer and thermometer are added 200 parts of concentrated sulfuric acid (90%) and 34 parts of water. The contents are stirred vigorously while heating to maintain a temperature of 80° C. for one hour. The mixture is then removed from the reaction vessel and filtered to recover a high grade phosphoric acid substantially free from fluorine contamination. On analysis, the product is found to consist essentially of phosphoric acid analyzing as 29.7% $P_2O_5$, 0.54% iron, 0.68% aluminum, 0.08% fluorine and no sulfuric acid.

On neutralization with calcium oxide, calcium orthophosphates are obtained. These are valuable as a source for phosphorus in animal nutrition.

*Example 2*

The free phosphoric acid obtained in Example 1 above, is conecntrated in triple-effect evaporators to 54% $P_2O_5$ content. A greenish-white precipitate forms during evaporation. The latter is removed, leaving a clear, solids-free liquid.

*Example 3*

The process of Example 1 above is followed in every respect, except that the initial calcination step is carried out at elevated temperatures between 1400° F. and 1450° F.

Acidification of the resultant calcined triple superphosphate results in a poor-grade phosphoric acid analyzing as 12.7% $P_2O_5$, 36% sulfuric acid and 0.04% fluorine.

The use of temperatures in excess of about 1350° F. is deleterious in that resultant acid is contaminated with sulfuric acid and the $P_2O_5$ content thereof is markedly decreased.

*Example 4*

The process of Example 1 above is repeated in every material detail, except that the calcination step is carried out at 900° F.

The phosphoric acid recovered is found to contain 0.37% fluorine. The acid is then reacted with calcium oxide to form the corresponding neutralized product. A useful animal feed supplement is not obtained due to the presence of markedly high fluorine content.

We claim:

1. In an improved process for preparing high-grade phosphoric acid useful as an animal feed supplement of high nutritional availability in its neutralized calcium salt, the improvement which consists essentially in: heat-treating triple superphosphate containing more than one percent fluorine at a temperature between 1050° F. and 1350° F. for from about ten minutes to about one hour to effect the reduction of fluorine content of said triple superphosphate to less than about 0.2%, acidifying the so-calcined triple superphosphate to its corresponding free acid form, said acidification step being carried out in the presence of at least stoichiometric amounts of concentrated sulfuric acid in relation to the calcium content of the defluorinated product and recovering a phosphoric acid of more than about 25% $P_2O_5$ by weight and a fluorine content of less than about 0.2%.

2. The process according to claim 1, in which the free acid obtained is further concentrated to a $P_2O_5$ content between about 40% and 60% by weight.

References Cited by the Examiner

UNITED STATES PATENTS

| | | | |
|---|---|---|---|
| 1,994,070 | 3/35 | Foss | 71—44 X |
| 2,288,112 | 6/42 | Shoeld | 71—47 X |
| 2,360,197 | 10/44 | Butt | 71—47 X |
| 2,384,856 | 9/45 | Ten Eyck et al. | 23—165 |
| 2,865,710 | 12/58 | Le Baron | 71—44 X |
| 3,101,999 | 8/63 | Malley et al. | 23—108 |
| 3,102,000 | 8/63 | Malley et al. | 23—108 |

MAURICE A. BRINDISI, *Primary Examiner.*